US010055885B2

(12) United States Patent
Goodman

(10) Patent No.: US 10,055,885 B2
(45) Date of Patent: Aug. 21, 2018

(54) SYSTEMS AND METHODS FOR DIGITAL ELEVATION MAP FILTERS FOR THREE DIMENSIONAL POINT CLOUDS

(71) Applicant: Raytheon Company, Waltham, MA (US)

(72) Inventor: Vernon R. Goodman, Rockwall, TX (US)

(73) Assignee: Raytheon Company, Waltham, MA (US)

( * ) Notice: Subject to any disclaimer, the term of this patent is extended or adjusted under 35 U.S.C. 154(b) by 44 days.

(21) Appl. No.: 15/195,198

(22) Filed: Jun. 28, 2016

(65) Prior Publication Data
US 2017/0076456 A1  Mar. 16, 2017

Related U.S. Application Data

(60) Provisional application No. 62/219,309, filed on Sep. 16, 2015.

(51) Int. Cl.
G06T 7/00 (2017.01)
G06T 17/05 (2011.01)
G06T 15/60 (2006.01)
G06T 5/00 (2006.01)

(52) U.S. Cl.
CPC .............. G06T 17/05 (2013.01); G06T 5/005 (2013.01); G06T 15/60 (2013.01); G06T 2207/10028 (2013.01); G06T 2207/10041 (2013.01); G06T 2207/30184 (2013.01); G06T 2215/12 (2013.01)

(58) Field of Classification Search
CPC ...... G06T 15/60; G06T 17/05; G06T 2215/12; G06T 5/005; G06T 2207/10041; G06T 2207/30184
See application file for complete search history.

(56) References Cited

U.S. PATENT DOCUMENTS

| 4,823,287 A * | 4/1989 | Thompson | G06T 11/203 340/990 |
| 6,597,818 B2 * | 7/2003 | Kumar | G06T 3/0081 382/284 |
| 6,810,153 B2 * | 10/2004 | Komura | G06T 3/0081 382/100 |
| 7,746,343 B1 * | 6/2010 | Charaniya | G06F 3/04815 345/428 |
| 2007/0206023 A1 * | 9/2007 | Street | A63F 13/10 345/582 |
| 2007/0237386 A1 * | 10/2007 | Berrill | G06K 9/209 382/154 |

(Continued)

Primary Examiner — Sean Conner
Assistant Examiner — Pinalben Patel
(74) Attorney, Agent, or Firm — Schwegman Lundberg & Woessner, P.A.

(57) ABSTRACT

Discussed herein are systems, devices, and methods for filtering digital elevation map (DEM) data. A method can include ingesting digital elevation map (DEM) data and intensity data from a panchromatic (PAN) or multi-spectral (MS) image, filling in voids in the ingested DEM data using local interpolation to create interpolated DEM data, creating a shadow map based on the received intensity data, modifying, using the created shadow map, a height of one or more pixels in the interpolated DEM data to create a modified DEM file, and storing the modified DEM file in a memory.

18 Claims, 8 Drawing Sheets

(56) References Cited

U.S. PATENT DOCUMENTS

| | | | |
|---|---|---|---|
| 2008/0140271 A1* | 6/2008 | Garceau | G06T 7/001 |
| | | | 701/10 |
| 2008/0212893 A1* | 9/2008 | Serbanescu | G01C 21/3635 |
| | | | 382/274 |
| 2010/0061626 A1* | 3/2010 | Ben-Moshe | G06T 17/05 |
| | | | 382/163 |
| 2010/0074538 A1* | 3/2010 | Mishra | G06K 9/6286 |
| | | | 382/224 |
| 2011/0144962 A1* | 6/2011 | Blask | G06T 17/05 |
| | | | 703/6 |
| 2012/0020557 A1* | 1/2012 | Gaubatz | G06T 5/005 |
| | | | 382/167 |
| 2012/0033196 A1* | 2/2012 | Vanek | G01S 7/4808 |
| | | | 356/4.01 |
| 2013/0060540 A1* | 3/2013 | Frahm | G06T 15/06 |
| | | | 703/2 |
| 2014/0118716 A1* | 5/2014 | Kaganovich | G01S 17/89 |
| | | | 356/4.01 |
| 2017/0083763 A1* | 3/2017 | Zang | G06K 9/52 |

\* cited by examiner

SYSTEMS AND METHODS FOR DIGITAL ELEVATION MAP FILTERS FOR THREE DIMENSIONAL POINT CLOUDS

RELATED APPLICATION

This application claims the benefit of priority to provisional patent application No. 62/219,309, filed on Sep. 16, 2015, titled "SYSTEMS AND METHODS FOR DIGITAL ELEVATION MAP FILTERS FOR THREE DIMENSIONAL POINT CLOUDS", which is incorporated by reference herein in its entirety.

TECHNICAL FIELD

One or more embodiments discussed herein generally relate to adjusting a point altitude in a three dimensional (3D) point cloud based on one or more features of a panchromatic (PAN) image. Some embodiments relate more specifically to changing an altitude of a digital elevation map (DEM) based on one or more of shadow, edge, and foliage maps of the PAN image.

BACKGROUND

A point cloud includes data points in some coordinate system. For example a 3D point cloud includes data in a plane (X and Y coordinates) and data indicating a height above or below the plane (Z coordinate). Point clouds generally represent external surfaces of objects. A point cloud can be created in a number of ways including using a 3D scanner or two-dimensional (2D) images of a surface from different perspectives.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments or examples discussed in the present document.

DETAILED DESCRIPTION

Figure 1:
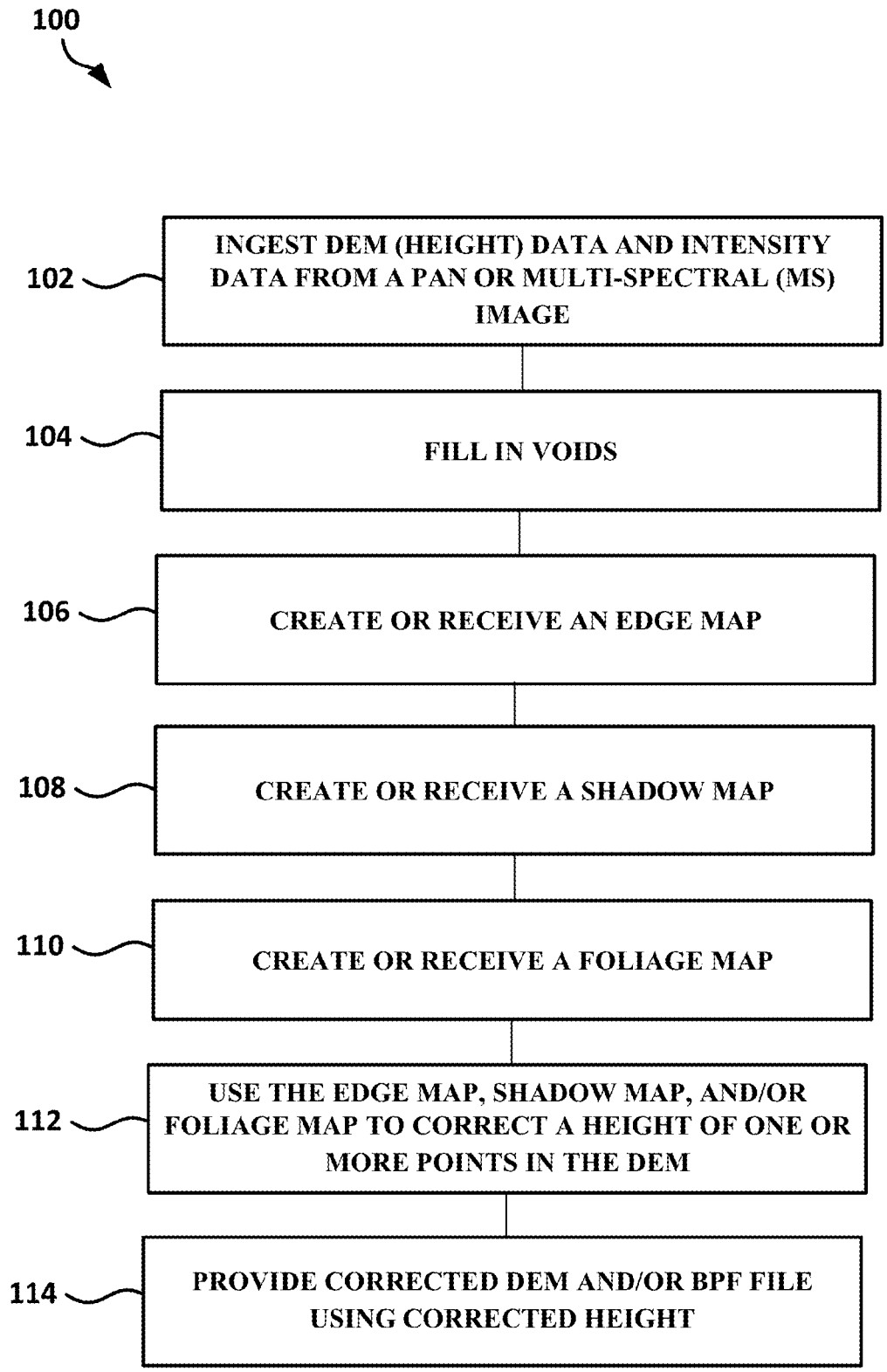
FIG. 1 illustrates, by way of example, an embodiment of a method for DEM filtering.

The following description and the drawings sufficiently illustrate specific embodiments to enable those skilled in the art to practice them. Other embodiments may incorporate structural, logical, electrical process, and other changes. Portions and features of some embodiments may be included in, or substituted for, those of other embodiments. Embodiments set forth in the claims encompass all available equivalents of those claims.

Embodiments in this disclosure generally regard adjusting a point altitude in a three dimensional (3D) point cloud using features of a panchromatic (PAN) image. The height of one or more points can be interpolated and corrected. Some embodiments relate more specifically to changing an altitude of a digital elevation map (DEM) based one or more of shadows, edges, and foliage maps of the PAN image.

DEMs can include holes and/or incorrectly interpolated points. This is true of a single aspect DEM created by a passive 3D point cloud generator using multiple images from differing aspects. Embodiments discussed herein can help correct the holes and/or incorrectly interpolated points in the 3D point cloud. In one or more embodiments, edges, foliage, and shadows present in the PAN image can be used to decide if and how much a point altitude of the DEM should be adjusted. Embodiments discussed herein describe the altitude (height) correction using multiple adaptive techniques, such as to fill in "holes" in 3D point clouds from data from a single view (a single PAN/MS image).

Embodiments can provide an output filtered DEM file (e.g., an image file) that includes filled in and/or corrected heights. Additionally or alternatively, embodiments can provide a binary point format (BPF) point cloud file created at a specified or default resolution for each input file. This BPF file is in pixel (line, sample) space and is included for comparison purposes. The projection to world-space can be performed after a DEM adjustment process is performed.

An advantage of the methods and systems discussed herein can include: (1) instead of blind smoothing of the DEM, methods and system can take into account shadows, edges, and/or foliage map data to correct the DEM; (2) methods and systems can adapt to differing characteristics of the scene, such as flat areas, ramps, rough areas, etc., using one or more of several local statistical methods; (3) edges and non-edges can be processed differently to allow edge and non-edge height values to be interpolated differently; (4) edges, which are generally fattened in DEMs, can be sharpened; and/or (5) details can remain in the DEM, such as for visual and/or mensuration purposes.

An idea behind DEM filtering is to use edge and/or shadow characteristics of a PAN image (registered to a specific geo-location in the 3D point cloud space) to correct for correlation biases in a 3D Point Cloud generation process. The DEM filter can determine shadows by darkness and/or can use a shadow map generated by a separate shadow map generating process. A separate foliage map can additionally or alternatively be used by the DEM filter process.

FIG. 1 illustrates, by way of example, an embodiment of a method 100 for DEM filtering. The method 100 as illustrated includes ingesting DEM (height) data and intensity data from a PAN or multi-spectral (MS) image, at operation 102; filling in voids using local interpolation, at operation 104; creating (or receiving) an edge map, at operation 106; creating (or receiving) a shadow map, at operation 108; creating (or receiving a foliage map), at operation 110; using the edge map, shadow map, and/or foliage map to correct a height of one or more points in the DEM, at operation 112; and provide a corrected DEM file and/or .bpf file.

The operation 102 can include reading the data from the PAN/MS image. The data can include image type (MS/PAN), resolution (number of pixels or density of pixels), intensity, position (X, Y, and/or Z), and/or color data. The data can be stored locally in a cache or other memory. The data can be translated into a format that makes it easier to retrieve specific data, such as for processing using the method 100.

Figure 2:
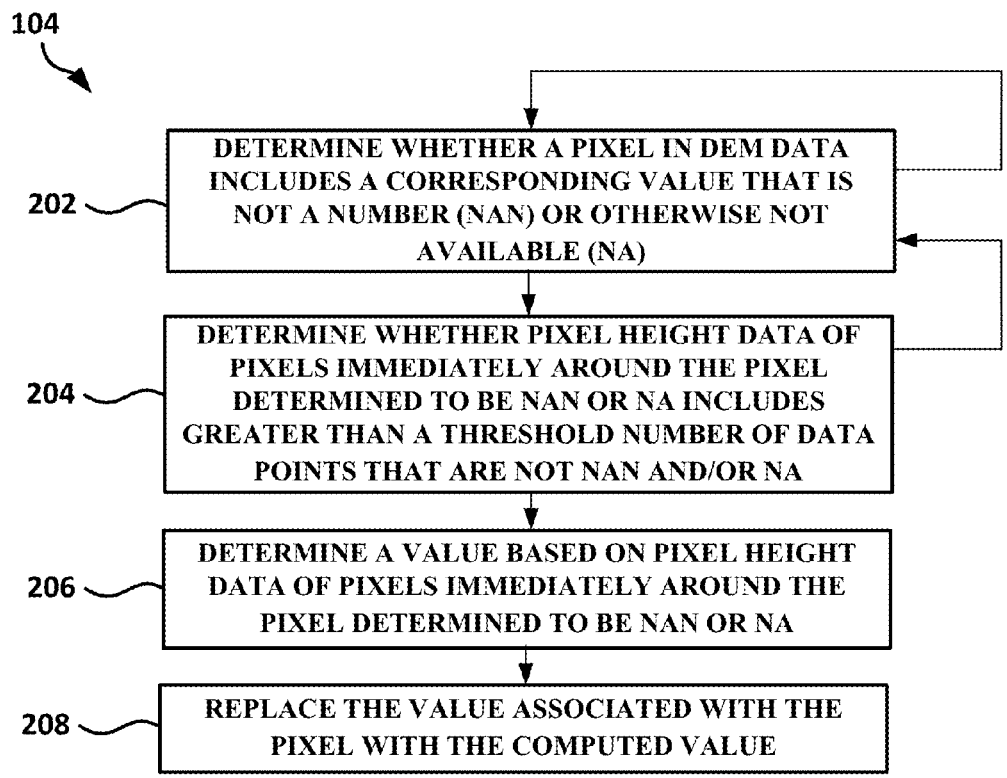
FIG. 2 illustrates, by way of example, an embodiment of a portion of the method of FIG. 1.

The operation 104 can include determining if a point in the DEM has a corresponding height value that is not a number (NaN) or is otherwise not available in the image data and interpolating a height value for any point that is not available. FIG. 2 illustrates, by way of example, an embodiment of a method for performing the operation 104.

The operation 104 as illustrated includes determining whether a point in the ingested DEM data includes a corresponding value that is NaN or otherwise not available (NA), at operation 202. The operation 202 can include determining whether the corresponding height value is equal to one or more specified values (e.g., if (pixel_height_value=NaN, pixel_height_value=value0, or pixel_height_value=value1)). In response to determining a pixel includes a corresponding height value that is NaN and/or NA, the operation 204 can be performed. In response to determining the pixel does not include a corresponding height value that is NaN or another specified height value, pixel data of another pixel can be ingested and operation 202 can be performed again (if pixel data of another pixel is available) or the method 104 can end.

The operation 204 as illustrated includes determining whether pixel height data of pixels immediately around the pixel determined to include height data that is NaN or NA a number of pixels with corresponding height values that are not NA and/or NaN greater than a specified threshold number of pixels, at operation 204. The operation 204 can include retrieving height values for pixels near the pixel determined to include the corresponding NaN/NA height value. The pixels near the pixel can include pixels within a specified distance, a specified number of nearest pixels, or other specified value of pixels near the pixel determined to include a corresponding height value that is NaN or NA. In one or more embodiments, the pixels near the pixel can include a grid (e.g., a specified number of column(s) and row(s) of pixels around the pixel, such as with the pixel determined to include a corresponding height value that is NaN or NA as the center of the grid (or near the center of the grid, such as if there is no one pixel in the center of the grid)) of pixels around the pixel determined to include a corresponding height value that is NaN or NA. For example, the grid can include a 5×5 square of pixels around the pixel determined to include a corresponding height value that is NaN or NA with the pixel determined to include a corresponding height value that is NaN or NA at the center of the grid. Other heuristics can be used to determine which pixels are considered in this calculation, such as the grid can include all pixels within the group of all pixels immediately surrounding the pixel determined to include a corresponding height value that is NaN or NA (i.e. all pixels in a 3×3 grid of pixels with the pixel determined to include a corresponding height value that is NaN or NA as the center pixel, which includes pixels with location indices in the group [(X+1, Y), (X−1, Y), (X+1, Y+1), (X, Y+1), (X−1, Y+1), (X+1, Y−1), (X, Y−1), (X−1, Y−1), all pixels within two steps of the pixel determined to include a corresponding height value that is NaN or NA (i.e. all pixels with indices in the group [(X+1, Y), (X−1, Y), (X+1, Y+1), (X, Y+1), (X−1, Y+1), (X+1, Y−1), (X, Y−1), (X−1, Y−1), (X, Y+2), (X, Y−2), (X−2, Y), (X+2, Y)]). Note that in the previous example, the coordinates (X, Y) are assumed to be the coordinates of the pixel determined to include a corresponding height value that is NaN or NA in the PAN/MS image. Note that some heuristics may not make sense for all pixels in the image, such as pixels on or near a boundary of an image. In one or more embodiments, another one or more heuristics can be used for these pixels if needed. In one or more other embodiments, the boundary pixels can be treated the same as center pixels and pixels that do not exist are counted as including a height value that is NaN and/or NA.

In response to determining the pixels immediately around the pixel determined to include height data that is NaN or NA is greater than the threshold number of pixels, the operation 206 can be performed. In response to determining the pixels immediately around the pixel determined to include height data that is NaN or NA is not greater than the threshold number of pixels, then the height data of the pixel can remain or NaN or NA. The operation 206 as illustrated includes determining a value based on pixel height data of pixels immediately around the pixels determined to be NaN or NA. The value can include a central value of the height data of the pixels immediately around the pixels determined to be NaN or NA. The central value can include a (rounded) median, mean, mode, or other measure of central value, such as can be determined after removal of values that are determined to be outliers (i.e. some threshold value difference away from an average of all the values or other outlier measure).

The operation 104 as illustrated includes replacing, in the DEM data, the NaN and/or NA height value of the pixel determined to include the corresponding height value that is NaN and/or NA with the determined value, at operation 208. The DEM data, after performing operation 104, is referred to as interpolated DEM data.

Figure 3:
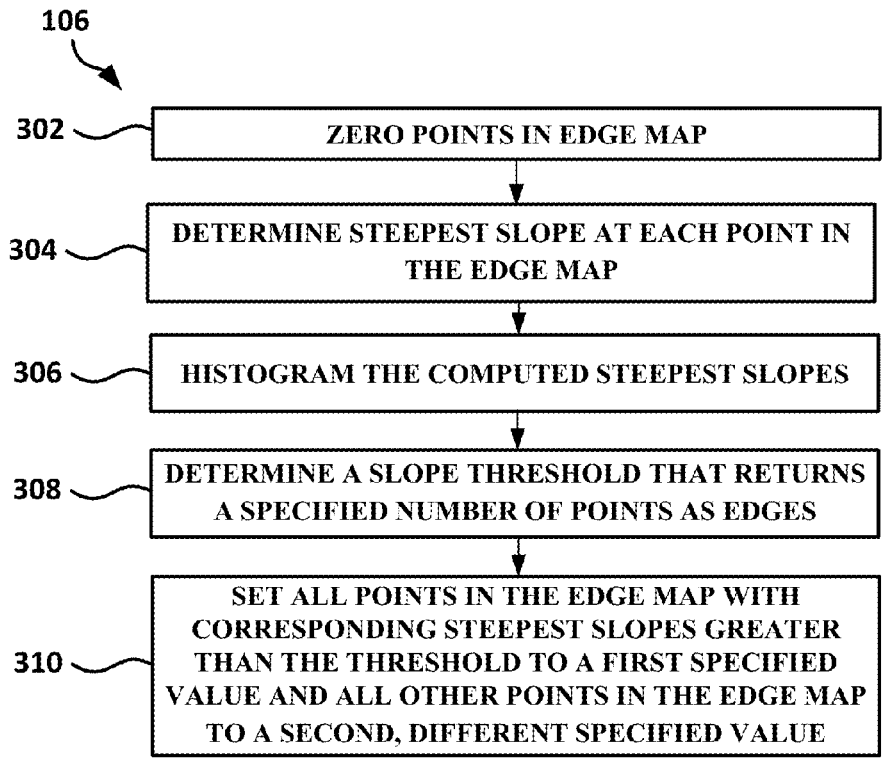
FIG. 3 illustrates, by way of example, an embodiment of a portion of the method of FIG. 1.

FIG. 3 illustrates, by way of example, an embodiment of a method for performing the operation 106. If the method 100 includes receiving the edge map, the operations of FIG. 3 may not be needed. The operation 106 as illustrated includes zeroing all points in an edge map, at operation 302. The size of the edge map can be the same as the size of the PAN/MS image. For example, if the PAN/MS image includes a 200×400 grid of pixels, the edge map can include a corresponding 200×400 number of points (i.e. entries), with each point corresponding to a pixel of the PAN/MS image.

The operation 106 as illustrated includes computing a steepest intensity change at each pixel in the PAN/MS image data to create a slope map. The steepest intensity change can be determined by determining an absolute intensity difference between a pixel and each pixel immediately surrounding the pixel (to yield up to eight absolute intensity differences for each pixel). The value that corresponds to the highest absolute intensity difference indicates the direction of the steepest intensity difference (i.e. slope) at a given pixel. The slope map can be populated by values determined based on the determined absolute intensity differences. The values can indicate a direction, a magnitude of the intensity difference, and/or the like. Generally, when plotted with intensity proportional to a slope, the edges of buildings become evident.

The operation 106 as illustrated includes creating a histogram of the slope map, at operation 306. The histogram can include a number of "bins" with each bin corresponding to a specified range of absolute intensity differences. Each pixel is added to the bin in accord with its corresponding determined absolute intensity difference.

The operation 106 as illustrated includes determining a slope threshold that accepts a specified number of pixels as edges (e.g., "edges" in Table 1), at operation 308. Alternatively, the operation 106 can include setting a slope threshold to consider pixels with magnitude differences greater than (or equal to) the slope threshold edges. The specified number of pixels can be determined through trial and error and/or experience. For example. The threshold can be set such that about fifty percent of the pixels in an image are considered edge pixels if the image includes a depiction of an urban area and twenty percent of pixels in an image are considered edge pixels if the image includes a depiction a rural area.

The operation 106 as illustrated includes setting all points in the edge map that include a corresponding value greater than (or equal to) the determined threshold to a specified (e.g., maximum) value (e.g., "1") and all other points can be set to a different specified (e.g., minimum) value (e.g., "0") (if the corresponding value is not already set to 0 by the zeroing in operation 302). The result is an edge map with a same number of entries as there are pixels in the PAN/MS image and each entry including a value indicating whether a corresponding pixel is considered an edge or not an edge pixel.

Figure 4:
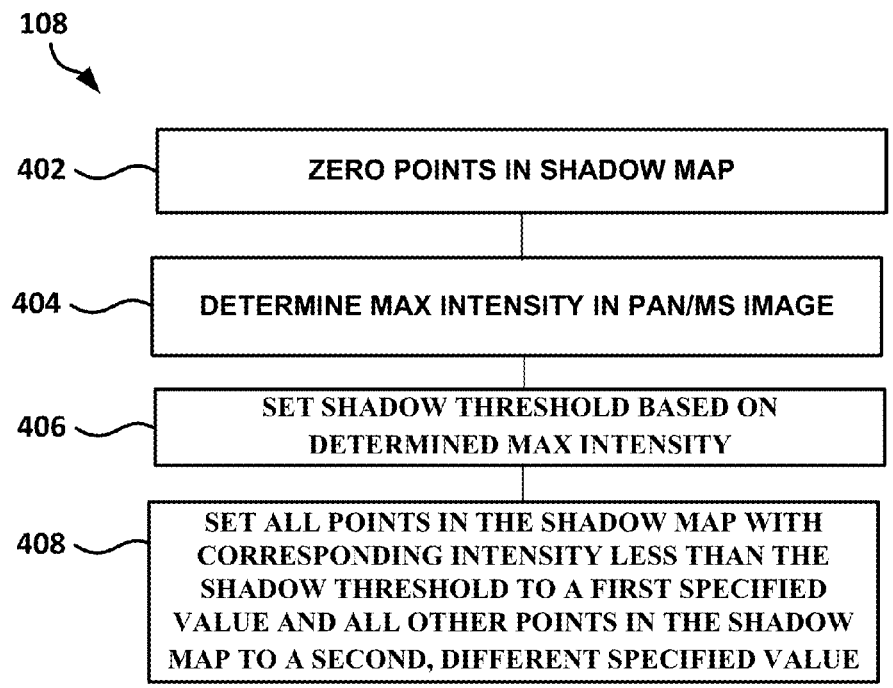
FIG. 4 illustrates, by way of example, an embodiment of a portion of the method of FIG. 1.

FIG. 4 illustrates, by way of example, an embodiment of a method for performing the operation 108. If the method 100 includes receiving the shadow map, the operations of FIG. 4 may not be needed. The operation 108 as illustrated includes zeroing all points in a shadow map. The size of the shadow map can be the same as the size of the PAN/MS image. For example, if the PAN/MS image includes a 200×400 grid of pixels, the shadow map can include a corresponding 200×400 number of points, with each point corresponding to a pixel of the PAN/MS image.

The operation 108 as illustrated includes determining a maximum possible intensity value of all pixels in the PAN/MS image data, at operation 404. This can be determined by determining a number of bits used to represent the intensity value. For example, if each pixel intensity value is 8 bits, the maximum intensity value is 255, and if each pixel intensity value is 16 bits, the maximum intensity value is 65535.

The operation 108 as illustrated further includes setting a shadow threshold based on the determined maximum intensity, at operation 406. In one or more embodiments, the shadow threshold can be the determined maximum intensity multiplied by a shadow ratio. The shadow ratio is variable and can be a fraction, such as ¹⁄₁₀ or 0.1, or other fraction. Some considerations in setting the shadow ration can include a dynamic range (e.g., a ratio between a minimum pixel value and maximum pixel value in the image) and average intensity of pixel values in the image. These considerations can be affected by a direction of lighting relative to an object in the image. For example, a threshold can be set and compared to a difference between an average intensity of pixel values in the image and the dynamic range.

The operation 108 can further include for each pixel in the PAN/MS image data that is less than (or equal to) the shadow threshold, set a corresponding point in the shadow map to a specified (e.g., maximum) value (e.g., "1") and all other points can be set to a different specified (e.g., minimum) value (e.g., "0"). In an embodiment in which each pixel can have an intensity value in the range [0, 255] and the shadow ratio is set to 0.1, all pixels with intensity value 25 or lower are considered shadow pixels. If the image is a color image, the intensity values of all the colors corresponding to the pixel can be summed (e.g., a weighted sum) and a panchromatic image value can be computed based on the sum. This value can then be compared to the threshold intensity value and the corresponding value in the shadow map can be set to "1" or "0" accordingly. The result is a shadow map with a same number of entries as there are pixels in the PAN/MS image and each entry including a value indicating whether a corresponding pixel is considered a shadow or not a shadow pixel.

Figure 5:
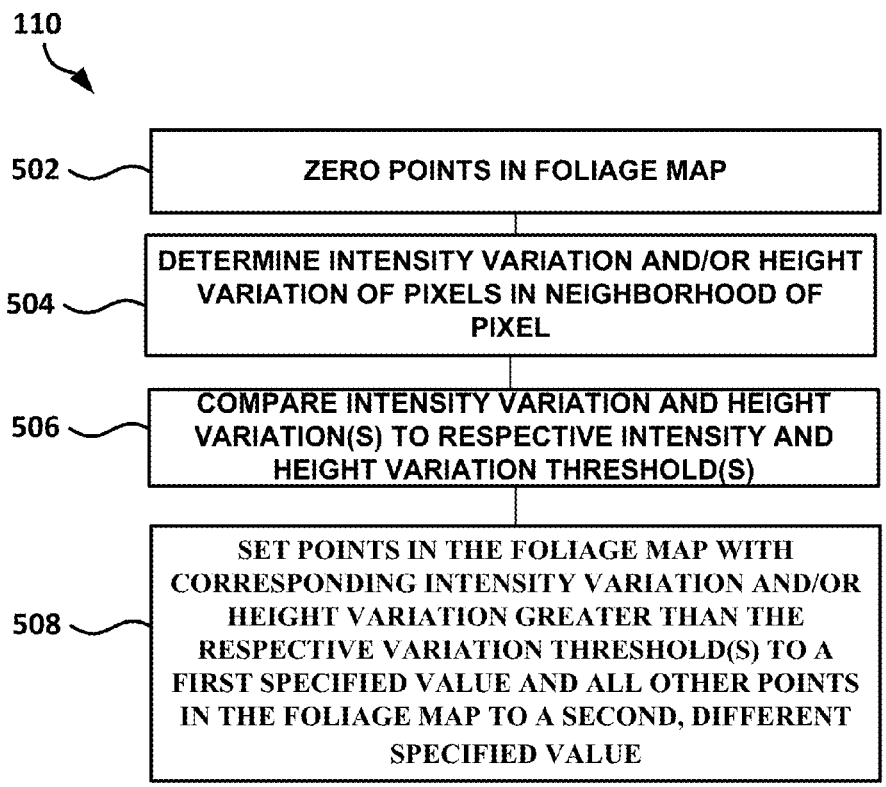
FIG. 5 illustrates, by way of example, an embodiment of a portion of the method of FIG. 1.

FIG. 5 illustrates, by way of example, an embodiment of a method for performing the operation 110. If the method 100 includes receiving the foliage map, the operations of FIG. 5 may not be needed. The operation 110 as illustrated includes zeroing all points in a foliage map, at operation 502. The size of the foliage map can be the same as the size of the PAN/MS image. For example, if the PAN/MS image includes a 200×400 grid of pixels, the foliage map can include a corresponding 200×400 number of points, with each point corresponding to a pixel of the PAN/MS image.

The operation 110 as illustrated includes determining an intensity variation and/or height variation of pixels in a neighborhood of the pixel, at operation 504. The variation can include a range, variance, standard deviation, mean absolute deviation, skewness, or other measure of variation. Generally speaking, more variation (e.g., chaos) in the intensity and/or height values of pixels in the neighborhood of a pixel indicates that it is more likely that the pixel is foliage or foliage-like. At operation 506, the intensity variation and/or the height variation can be compared to respective intensity variation and/or height variation thresholds. The thresholds can be set using empirical evidence, such as by determining one or more intensity or height variations based on intensity and/or height variations of pixels known to be foliage and using an average or other statistic of the determined variations as the threshold. At operation 508, points in the foliage map with corresponding intensity and/or height variation(s) greater than (or equal to) the respective variations threshold(s) are set to a first specified value (e.g., "1") and points determined to be less than (or equal to) the respective threshold(s) can be set to a second, different specified value (e.g., "0").

Alternatively, a normalized difference vegetative index (NDVI) can be used to determine whether a particular pixel is considered foliage. The NDVI can be based on an intensity of a Near Infrared Band (NIB) and an intensity of a red band (RED) (e.g., (NIR−RED)/(NIR+RED)). Generally, values near +1 can indicate vegetation. Other methods of forming the foliage exist and can be used to create the foliage map. The result is a foliage map with a same number of entries as there are pixels in the PAN/MS image and each entry including a value indicating whether a corresponding pixel is considered a foliage or not a foliage pixel.

Figure 6:
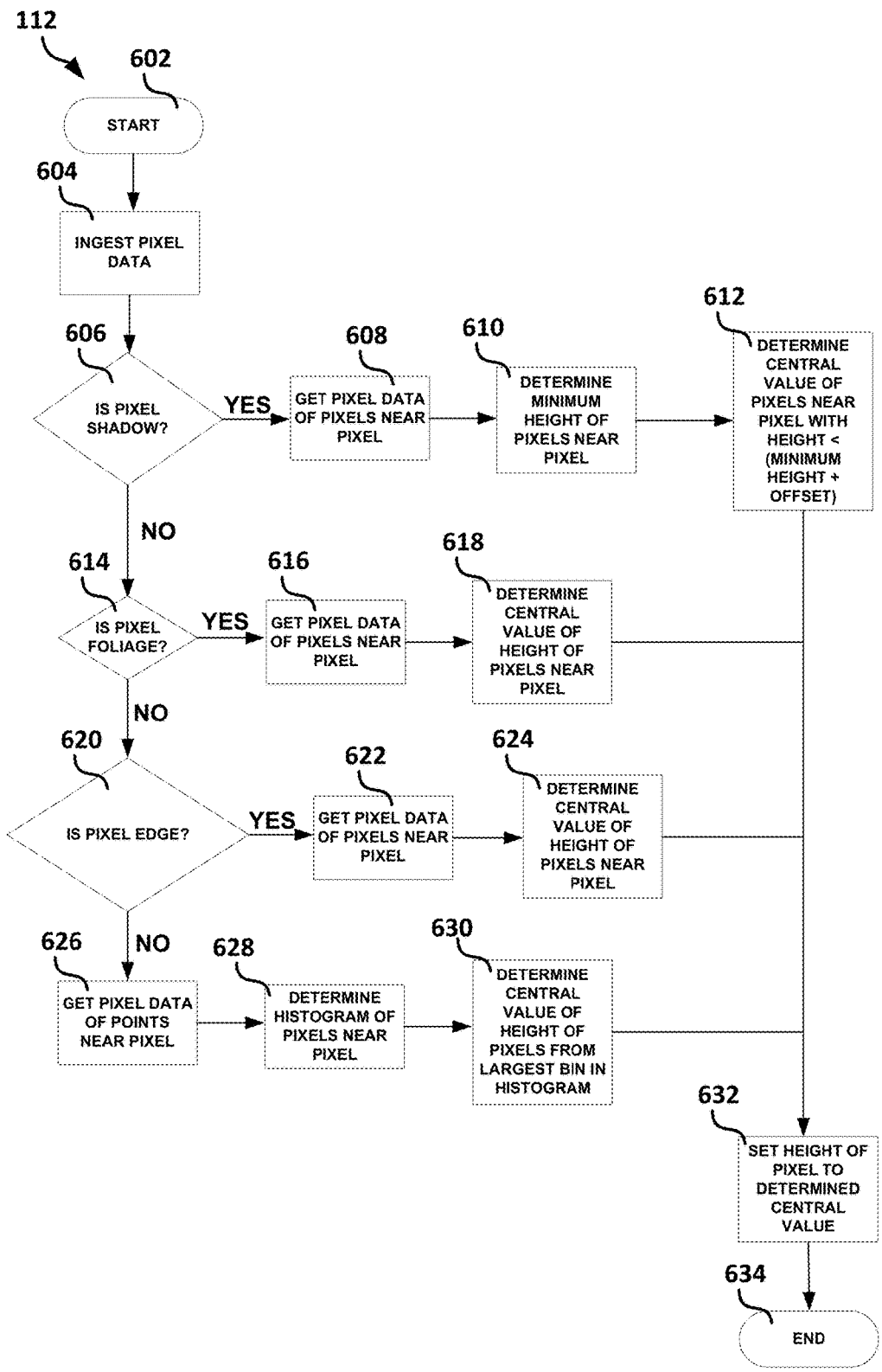
FIG. 6 illustrates, by way of example, an embodiment of a portion of the method of FIG. 1.

The method 100 as illustrated includes using the (created or received) edge map, shadow map, and/or foliage map to correct a height of one or more points in the DEM data, at operation 112. FIG. 6 illustrates, by way of example, an embodiment of a method for performing the operation 112. The operation 112 as illustrated includes beginning, at operation 602. The operation 112 as illustrated includes ingesting pixel data, at operation 604. Ingesting pixel data can include storing data corresponding to a single pixel locally or storing data of more than one pixel (e.g., pixel data of a pixel and neighboring pixels, pixel data of all pixels in the image, or other) locally.

The operation 112 as illustrated includes determining if an ingested pixel corresponds to a shadow, at operation 606.

The operation 606 can include determining whether an entry, in the shadow map, that corresponds to the pixel is set to the value that indicates the pixel is considered a shadow. If the pixel is determined to correspond to a shadow, the operation 112 can continue at operation 608. If the pixel is determined to not correspond to a shadow, the operation 112 can continue at operation 608.

The operation 608 can include retrieving pixel data of pixels near the pixel determined to correspond to a shadow. The operation 608 can include retrieving height values for pixels near the pixel determined to be a shadow. The pixels near the pixel can include pixels within a specified distance, a specified number of nearest pixels, or other specified pixels near the pixel determined to be shadow, such as a random number of pixels within a specified distance of the pixel determined to be a shadow. In one or more embodiments, the pixels near the pixel can include a grid of pixels around the pixel determined to be shadow (e.g., a specified number of column(s) and row(s) of pixels located around or near the pixel, such as with the pixel determined to be shadow as the center of the grid (or near the center of the grid, such as if there is no one pixel in the center of the grid)).

The pixels near the pixel can be defined as a square of pixels ((awin*2+1) row pixels and (awin*2+1) column pixels). The variable awin is configurable and can be set based on a general size of objects in the image and a ground sampling distance. Note that instead of having the same number of rows and columns, another variable (e.g., awin_2) can be defined to allow the number of column and row pixels to be different numbers.

A minimum height of the pixels near the pixel determined to be shadow can be determined at operation 610, such as by looking up the heights of the points in the neighborhood in the interpolated DEM data. The operation 112 can include determining a central value of heights of pixels near the pixel determined to be shadow that include heights less than the minimum height plus an offset value (e.g., a constant or variable offset), at operation 612. In one or more embodiments, the offset can be minimum_height+height/H, where height is a configurable variable as is shown in Table 1 and can be set based on the height of one or more objects in the image and H is an integer or real number. For example, for an image including one-story houses, height can be set to three, and can be set to a lower value if the image includes tents in an open field.

The operation 112 can continue at operation 630 in which the height of the pixel determined to be shadow is set to the central value determined at operation 612. In one or more other embodiments, operation 612 is not performed and operation 632 includes setting the height of pixels determined to be shadow to the determined minimum height of pixels near the pixel determined to be shadow.

The operation 112 as illustrated includes determining if an ingested pixel corresponds to foliage, at operation 614. The operation 614 can include determining whether an entry, in the foliage map, that corresponds to the pixel is set to the value that indicates the pixel is considered foliage. If the pixel is determined to correspond to foliage, the operation 112 can continue at operation 616. If the pixel is determined to not correspond to foliage, the operation 112 can continue at operation 620.

The operation 616 can include retrieving pixel data of pixels near the pixel determined to correspond to foliage. The operation 616 is similar to the operation 608, with the operation 616 corresponding to a pixel determined to be foliage.

The operation 112 can include determining a central value of heights of pixels near the pixel determined to be foliage, at operation 618. The operation 112 can continue at operation 632 in which the height of the pixel determined to be foliage in the interpolated DEM data is set to the central value determined at operation 618.

The operation 112 as illustrated includes determining if an ingested pixel corresponds to an edge, at operation 620. The operation 620 can include determining whether an entry, in the edge map, that corresponds to the pixel is set to the value that indicates the pixel is considered an edge. If the pixel is determined to correspond to an edge, the operation 112 can continue at operation 622. If the pixel is determined to not correspond to an edge, the operation 112 can continue at operation 626.

The operation 622 can include retrieving pixel data of pixels near the pixel determined to correspond to an edge. The operation 622 is similar to the operation 608, with the operation 622 corresponding to a pixel determined to be an edge.

The operation 112 can include determining a central value of heights of pixels near the pixel determined to be an edge, at operation 624. The operation 112 can continue at operation 632 in which the height of the pixel determined to be an edge in the interpolated DEM data is set to the central value determined at operation 624.

The operation 626 can include retrieving pixel data of pixels near the pixel determined to not correspond to a shadow, foliage, and edge. The operation 622 is similar to the operation 608, with the operation 622 corresponding to a pixel determined to not be an edge, shadow, and foliage.

The operation 112 can further include determining a histogram of height values of (non-edge) pixels near the pixel determined to not be an edge, a shadow, and foliage (e.g., (awin*2+1) row pixels by (awin*2+1) column pixels). The histogram can include a specified number of value bins, such as three or other number of value bins. The histogram can include a number of "bins" with each bin corresponding to a specified range of heights. Each pixel is added to the bin in accord with its corresponding height (e.g., interpolated height).

The operation 112 can include determining a central value of heights of pixels in the largest bin of the histogram created at operation 628, at operation 6230. The operation 112 can continue at operation 632 in which the height of the pixel determined to be not be any of a shadow, edge, and foliage in the interpolated DEM data is set to the central value determined at operation 630. The operation 112 can end at operation 634.

Note that some pixels may have corresponding points (e.g., pixels) in multiple maps. For example a pixel may be considered to correspond to a shadow and foliage, or a shadow and an edge, or other combination of the shadow, foliage, and edge. So as to not adjust the height of the pixel more than once, a rule can be set to handle conflicts. For example, it can be determined first if the pixel has a corresponding point in the shadow map, and only if it does not include a corresponding point in the shadow map, then it can be determined if the pixel has a corresponding point in the foliage map, and only if it does not include a corresponding point in the foliage map, then it can be determined if the pixel has a corresponding point in the edge map, and only if it does not include a corresponding point in the edge map, and then the processing can treat the pixel as a non-shadow, non-foliage, and non-edge pixel and adjust the height accordingly. The order in which it is determined whether the pixel corresponds to a shadow, foliage, and edge is variable and can be done in any order. In one or more embodiments, the shadow map, edge map, and/or foliage map are optional and the corresponding operations regarding the specific maps are also optional. That is, in embodiments in which there is no foliage in the PAN/MS image, or foliage is otherwise not considered, the operations 614, 616, 618, and 110 can be left out or skipped. Similarly, operations can be left out or skipped if there are no edges or shadows in the map, respectively, or they are otherwise not considered.

Figure 7:
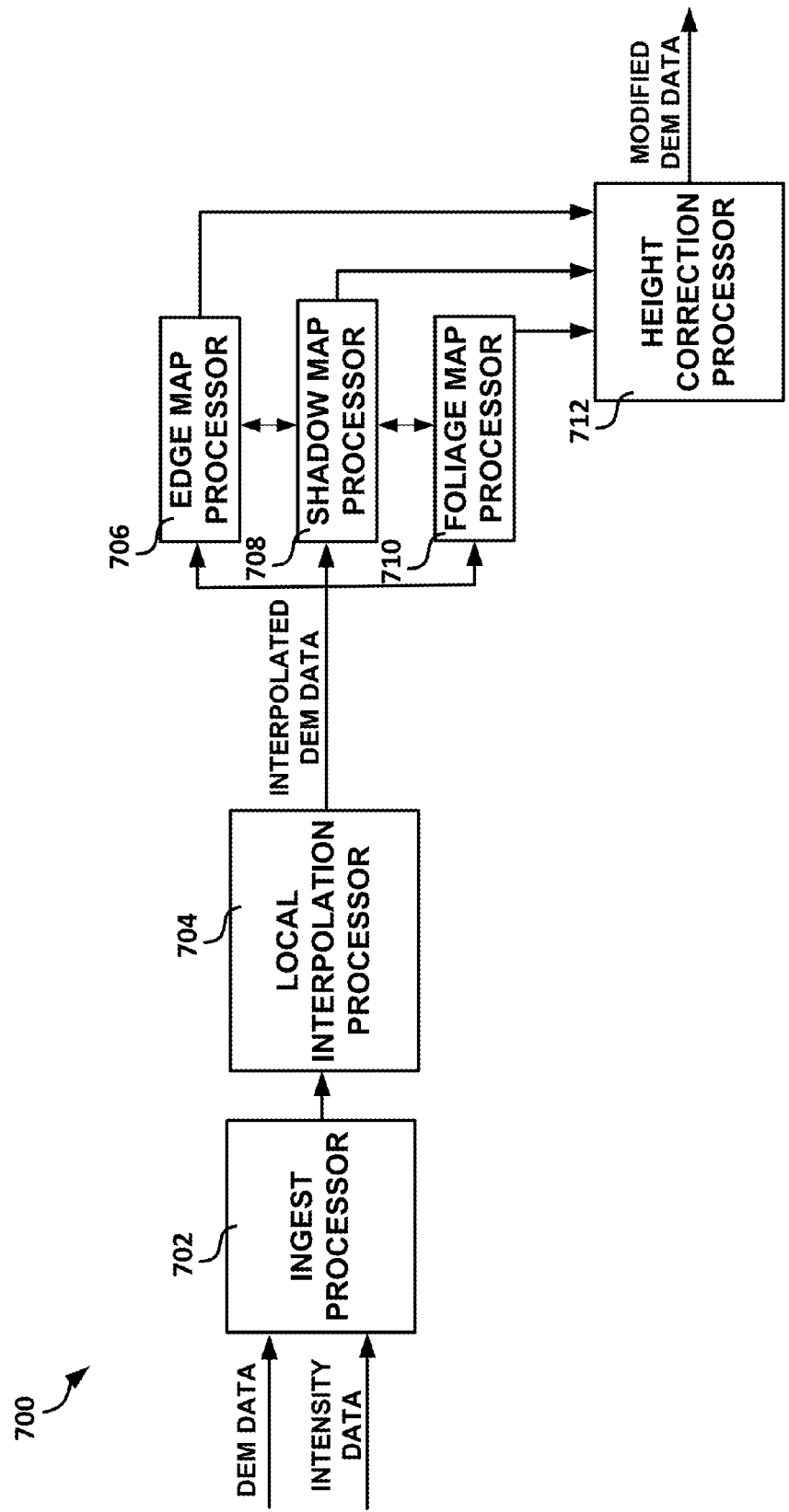
FIG. 7 illustrates, by way of example, an embodiment of a system for modifying a DEM based on PAN (or MS) image data.

FIG. 7 illustrates, by way of example, an embodiment of a system 700 for modifying a DEM based on PAN/MS image data. The ingest processor 702 can perform the operation 102. The interpolation processor 704 can perform the operation 104. The edge map processor can perform the operation 106. The shadow map processor 708 can perform the operation 108. The foliage map processor 710 can perform the operation 110. The height correction processor 712 can perform the operation 112. The height correction processor 712 can produce a modified DEM data file, which is the result of performing the operation 112.

The following table illustrates, by way of example, variables and definitions that can be used to implement a DEM filter as discussed herein.

TABLE 1

Example DEM filter variables

| Symbol | Description | Units | Default |
|---|---|---|---|
| inputdirectory | Input directory containing .bpf files | n/a | n/a |
| DEM_file | File containing DEM in raster or png format | Meters | n/a |
| Raster_file | File containing PAN raster | n/a | n/a |
| outdir=xxx | Output directory | n/a | Input directory |
| ewin=nn | Edge smoothing size | Pixels | 1 |
| awin=nn | Non-edge smoothing size | Pixels | 1 |
| edges=0.xx | Threshold for ratio of pixels to consider as edges (i.e., 0.9 means 10% of pixels are edges) | n/a | 0.75 |
| shadows=0.xx | Shadow contrast | n/a | 0.1 |
| points=x | Points to fill in and smooth at edges | n/a | 4 |
| height=xx.x | Height difference to begin sharpening | Meters | 4.0 |
| cores | Number of processing cores | n/a | n/a |

Figure 8:
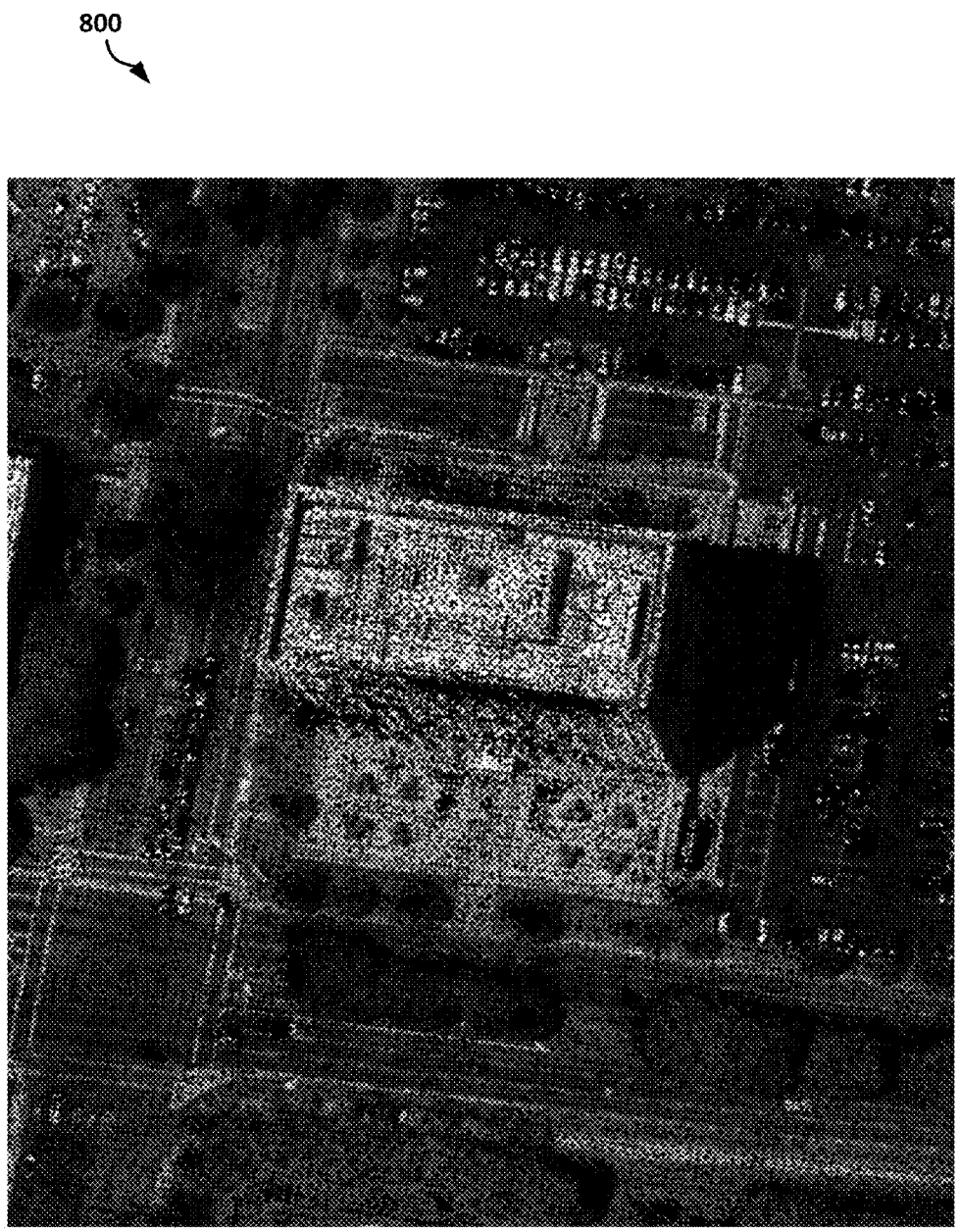
FIG. 8 illustrates an example of an image before height interpolation and correction.
Figure 9:
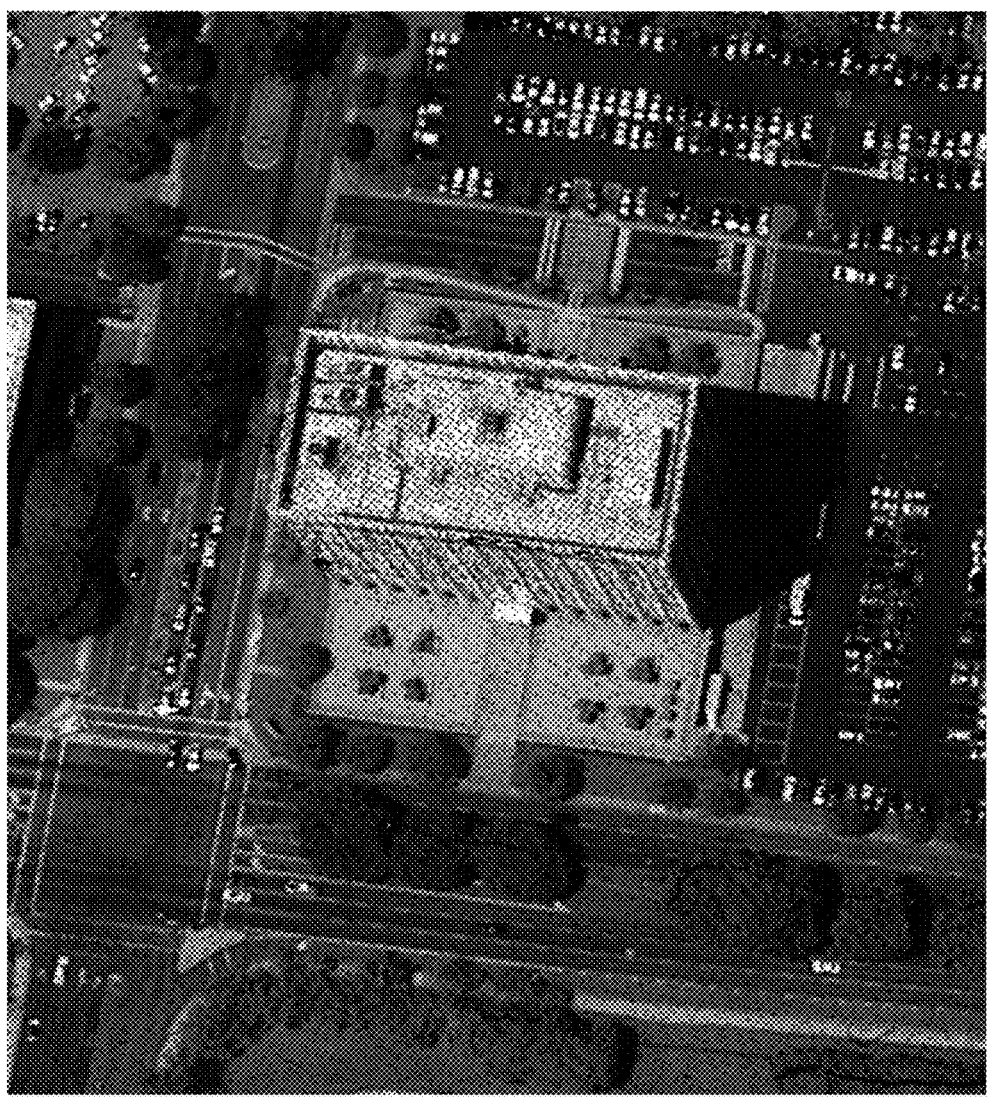
FIG. 9 illustrates an image after height interpolation and correction using an embodiment discussed herein.

FIG. 8 illustrates an image 800 before height interpolation and modification and FIG. 9 illustrates an image 900 after height interpolation and modification using an embodiment discussed herein. As can be seen, the image 900 has much better spatial resolution than the image 800, making it easier to discern objects depicted in the image 900.

Modules, Components and Logic

Certain embodiments are described herein as including logic or a number of components, modules, processors, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry, e.g., a field programmable gate array (FPGA) or an application-specific integrated circuit (ASIC).

The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium (e.g., Storage Device)

Figure 10:
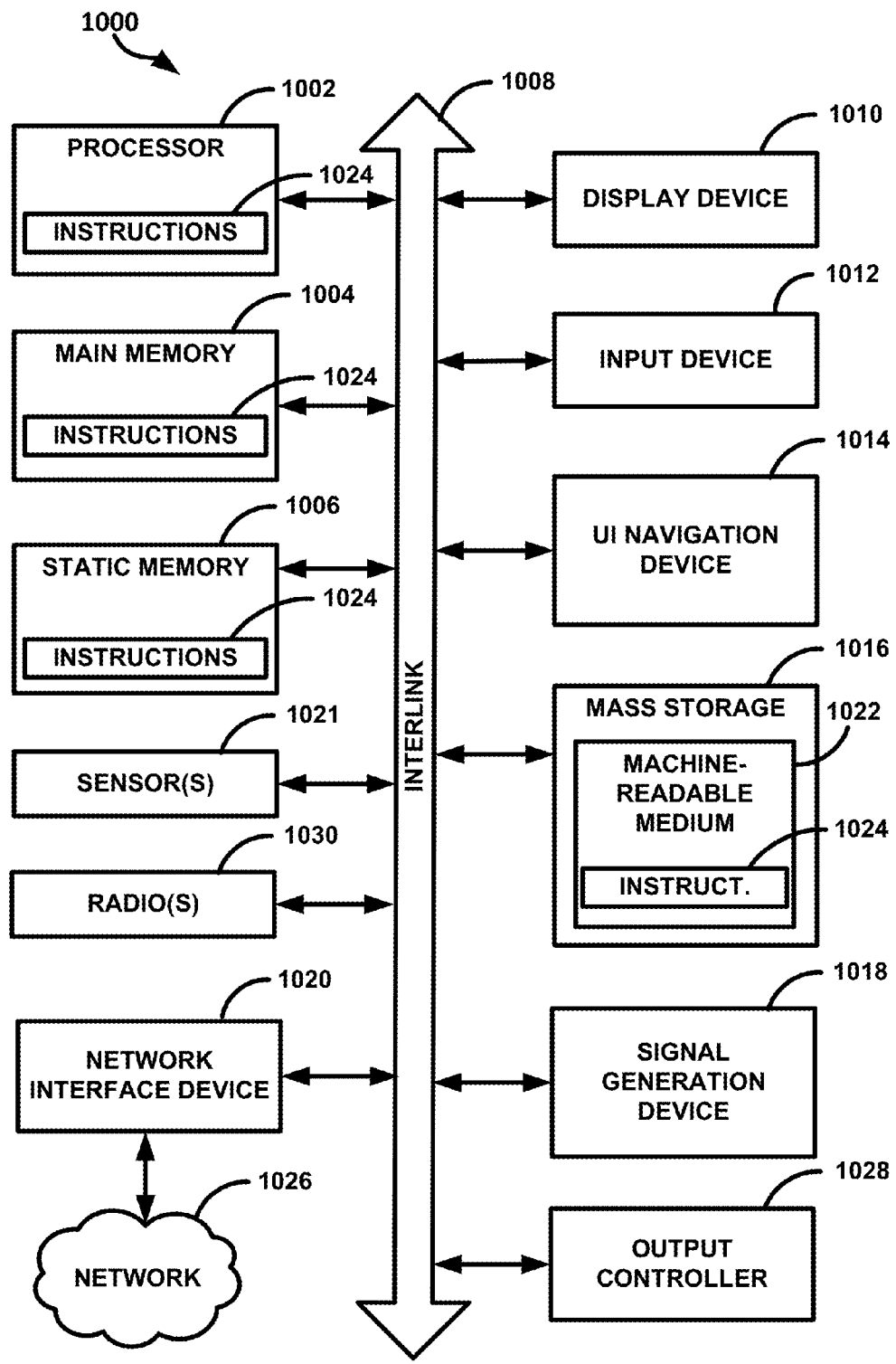
FIG. 10 illustrates, by way of example, a logical block diagram of an embodiment of a machine within which instructions, for causing the machine to perform any one or more of the methodologies discussed herein, may be executed.

FIG. 10 illustrates, by way of example, a block diagram of an embodiment of a machine in the example form of a computer system 1000 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation device 1014 (e.g., a mouse), a disk drive unit 1016, a signal generation device 1018 (e.g., a speaker), a network interface device 1020 (e.g., a network interface card (NIC) and/or radio(s) 1030, such as Bluetooth, WWAN, WLAN, and NFC), permitting the application of security controls on such protocols.

Machine-Readable Medium

The disk drive unit 1016 includes a machine-readable medium 1022 on which is stored one or more sets of instructions and data structures (e.g., software) 1024 embodying or utilized by any one or more of the methodologies or functions described herein. The instructions 1024 may also reside, completely or at least partially, within the main memory 1004 and/or within the processor 1002 during execution thereof by the computer system 1000, the main memory 1004 and the processor 1002 also constituting machine-readable media.

While the machine-readable medium 1022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

ADDITIONAL NOTES AND EXAMPLES

In Example 1 a non-transitory machine-readable storage device includes instructions stored thereon that, when executed by one or more processors, cause the one or more processors to perform operations for filtering digital elevation map (DEM) data of a three dimensional point cloud, the operations comprising ingest digital elevation map (DEM) data and intensity data from a panchromatic (PAN) or multi-spectral (MS) image, fill in voids in the DEM data using local interpolation to create interpolated DEM data, create a shadow map based on the received intensity data, modify, using the shadow map, a height of one or more pixels in the interpolated DEM to create a modified DEM file, and store, in a memory, the modified DEM file.

In Example 2 the storage device of Example 1 can include, instructions stored thereon that, when executed by the one or more processors, cause the one or more processors to further create an edge map based on the received intensity data and wherein modification of the height of one or more pixels in the modified DEM file includes further modification of the height of one or more pixels in the modified DEM file based on the created edge map.

In Example 3 the storage device of at least one of Examples 1-2 can include instructions stored thereon that, when executed by the one or more processors, cause the one or more processors to further create a foliage map and wherein modification of the height of one or more pixels in the modified DEM data includes further modification of the height based on the created foliage map.

In Example 4 the storage device of at least one of Examples 1-3 can include, wherein the instructions to fill in voids of the DEM data include instructions that, when executed by the one or more processors, cause the one or more processors to determine whether a pixel in the DEM data includes a corresponding height that is not a number (NaN), determine whether there are more than a threshold number of pixels in a specified area of pixels around the pixel determined to include a corresponding height that is NaN, in response to a determination that there are more than a threshold number of pixels in a specified area of pixels around the pixel determined to include a corresponding height that is NaN, determine a central value of heights of pixels, around the pixel including the corresponding height that is NaN, that are within the specified area, and replace the height value of the pixel determined to include the corresponding height that is NaN with the determined central value.

In Example 5 the storage device of at least one of Examples 1-4 can include, wherein the instructions to create the edge map include instructions that, when executed by the one or more processors, cause the one or more processors to compute a steepest intensity change at each pixel in the intensity data as respective entries in a slope map, create a histogram of the computed steepest intensity changes in the slope map, determine a slope threshold that accepts a specified number of pixels as edges, and set respective entries in the edge map in accord with whether a corresponding entry in the slope map includes a value greater than (or equal to) the determined threshold to a first specified value and set all other pixels to a second, different specified value to create the edge map.

In Example 6 the storage device of at least one of Examples 1-5 can include, wherein the instructions to create the shadow map include instructions that, when executed by the one or more processors, cause the one or more processors to determine a maximum intensity of pixels in the PAN (or MS) image data, set a shadow threshold to a shadow ratio times the determined maximum intensity, and for each pixel in the PAN (or MS) image data that is less than (or equal to) the shadow threshold, set a corresponding entry in the shadow map to a specified value and setting all other entries in the shadow map to a different specified value.

In Example 7 the storage device of at least one of Examples 1-6 can include instructions stored thereon that, when executed by the one or more processors, cause the one or more processors to further determine if a pixel in the PAN or MS image data corresponds to a shadow pixel as defined by the shadow map, and in response to a determination that the pixel corresponds to a shadow pixel, modify the height of one or more pixels in the modified DEM including determine a number of pixels around the pixel corresponding to the shadow, determine a minimum height of all the pixels in the number of pixels around the pixel corresponding to the shadow, determine a central value of heights of pixels in the number of pixels around the pixel corresponding to the shadow determined to be less than (or equal to) the determined minimum height plus an offset, and set a height of the pixel in the modified DEM data to the determined central value.

In Example 8 the storage device of at least one of Examples 1-7 can include instructions stored thereon that, when executed by the one or more processors, cause the one or more processors to further determine if a pixel in the PAN or MS image data corresponds to a foliage pixel as defined by the foliage map, and in response to determining the pixel corresponds to a foliage pixel, correction of the height of one or more pixels in the interpolated DEM data includes determine a central value of heights of a specified number of pixels in a neighborhood of the foliage pixel that are determined to be foliage pixels, and set the height of the foliage pixel to the determined central value.

In Example 9 the storage device of at least one of Examples 1-8 can include instructions stored thereon that, when executed by the one or more processors, cause the one or more processors to further determine if a pixel in the PAN or MS image data corresponds to an edge pixel as defined by the edge map, and in response to determining the pixel corresponds to an edge pixel, correction of the height of one or more pixels in the interpolated DEM data includes determine a central value of heights of a specified number of pixels in a neighborhood of the edge pixel that are determined to be edge pixels, and setting the height of the edge pixel in the modified DEM data to the determined central value.

In Example 10 the storage device of at least one of Examples 1-9 can include instructions stored thereon that, when executed by the one or more processors, cause the one or more processors to further determine if a pixel in the PAN or MS image does not correspond to any of a shadow pixel, an edge pixel, and a foliage pixel and, in response to determining the pixel does not correspond to any of a shadow pixel, an edge pixel, and a foliage pixel correction of the height of one or more pixels in the interpolated DEM data includes compute a histogram of height values of non-edge pixels in a neighborhood of the non-shadow, non-edge, and non-foliage pixel, determine a central value of heights of pixels in a bin of the histogram that includes the most pixels of all the bins, and replace the height value of the corresponding pixel in the modified DEM data with the determined central value.

In Example 11 a method for filtering digital elevation map (DEM) data includes ingesting digital elevation map (DEM) data and intensity data from a panchromatic (PAN) or multi-spectral (MS) image, filling in voids in the ingested DEM data using local interpolation to create interpolated DEM data, creating a shadow map based on the received intensity data, modifying, using the created shadow map, a height of one or more pixels in the interpolated DEM data to create modified DEM data, and providing signals to a display that cause an image to be displayed based on the modified DEM data.

In Example 12 the method of Example 11 can include creating an edge map based on the received intensity data and wherein modifying the height of one or more pixels in the modified DEM file includes further modifying the height of one or more pixels in the modified DEM file based on the created edge map.

In Example 13 the method of at least one of Examples 11-12 can include creating a foliage map and wherein modifying the height of one or more pixels in the modified DEM file includes further modifying the height based on the created foliage map.

In Example 14 the method of at least one of Examples 11-13 can include determining whether a pixel in the DEM data includes a corresponding height that is not a number (NaN), determining whether there are more than a threshold number of pixels in a specified area of pixels around the pixel determined to include a corresponding height that is NaN, in response to a determination that there are more than a threshold number of pixels in a specified area of pixels around the pixel determined to include a corresponding height that is NaN, determining a central value of heights of pixels, around the pixel including the corresponding height that is NaN, that are within the specified area, and replacing the height value of the pixel determined to include the corresponding height that is NaN with the determined central value.

In Example 15 the method of at least one of Examples 11-14 can include, wherein creating the edge map includes computing a steepest intensity change at each pixel in the intensity data as respective entries in a slope map, creating a histogram of the computed steepest intensity changes in the slope map, determining a slope threshold that accepts a specified number of pixels as edges, and setting respective entries in the edge map in accord with whether a corresponding entry in the slope map includes a value greater than (or equal to) the determined threshold to a first specified value and set all other pixels to a second, different specified value to create the edge map.

In Example 16 a system for filtering digital elevation map (DEM) data includes an ingest processor to ingest digital elevation map (DEM) data and intensity data from a panchromatic (PAN) or multi-spectral (MS) image, a local interpolation processor to fill in voids in the ingested DEM data using local interpolation to create interpolated DEM data, a shadow map processor to create a shadow map based on the received intensity data, a height correction processor to modify, using the created shadow map, a height of one or more pixels in the interpolated DEM data to create modified DEM data, and a memory to store the modified DEM data.

In Example 17 the system of Example 16 can include, wherein the height correction processor is further to determine if a pixel in the PAN or MS image data corresponds to a shadow pixel as defined by the shadow map, and wherein modification of the height of one or more pixels in the ingested DEM data includes, in response to a determination that the pixel corresponds to a shadow pixel determine a number of pixels around the pixel corresponding to the shadow, determine a minimum height of all the pixels in the number of pixels around the pixel corresponding to the shadow based on height data in the interpolated DEM data, determine a central value of heights of pixels in the number of pixels around the pixel corresponding to the shadow determined to be less than (or equal to) the determined minimum height plus an offset, and set a height of the pixel in the modified DEM data to the determined central value.

In Example 18 the system of at least one of Examples 16-17 can include, wherein the height correction processor is further to determine if a pixel in the PAN or MS image data corresponds to a foliage pixel as defined by the foliage map, and wherein modification of the height of one or more pixels in the interpolated DEM data includes, in response to a determination that the pixel corresponds to a foliage pixel determine a central value of heights of a specified number of pixels in a neighborhood of the foliage pixel that are determined to be foliage pixels, and set the height of the foliage pixel to the determined central value.

In Example 19 the system of at least one of Examples 16-18 can include, wherein the height correction processor is further to determine if a pixel in the PAN or MS image data corresponds to an edge pixel as defined by the edge map, and wherein modification of the height of one or more pixels in the interpolated DEM data includes, in response to a determination that the pixel corresponds to an edge pixel determine a central value of heights of a specified number of pixels in a neighborhood of the edge pixel that are determined to be edge pixels, and setting the height of the edge pixel in the modified DEM data to the determined central value.

In Example 20 the system of at least one of Examples 16-19 can include, wherein the height correction processor is further to determine if a pixel in the PAN or MS image does not correspond to any of a shadow pixel, an edge pixel, and a foliage pixel and, in response to determining the pixel does not correspond to any of a shadow pixel, an edge pixel, and a foliage pixel modification of the height of one or more pixels in the interpolated DEM data includes compute a histogram of height values of non-edge pixels in a neighborhood of the non-shadow, non-edge, and non-foliage pixel, determine a central value of heights of pixels in a bin of the histogram that includes the most pixels of all the bins, and replace the height value of the corresponding pixel in the modified DEM data with the determined central value.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A non-transitory machine-readable storage device including instructions stored thereon that, when executed by one or more processors, cause the one or more processors to perform operations for filtering digital elevation map (DEM) data of a three dimensional point cloud, the operations comprising:
    ingest digital elevation map (DEM) data and intensity data from a panchromatic WAN) or multi-spectral (MS) image;
    fill in voids in the DEM data using local interpolation to create interpolated DEM data;
    create a shadow map based on the received intensity data;
    modify, using the shadow map, a height of one or more pixels in the interpolated DEM data to create a modified DEM file including determine if a pixel in the PAN or MS image data corresponds to a shadow pixel as defined by the shadow map and wherein modification of the height of one or more pixels in the ingested DEM data includes, in response to a determination that the pixel corresponds to a shadow pixel:
        determine a number of pixels around the pixel corresponding to the shadow,
        determine a minimum height of all the pixels in the number of pixels around the pixel corresponding to the shadow based on height data in the interpolated DEM data,
        determine a central value of heights of pixels in the number of pixels around the pixel corresponding to the shadow determined to be less than (pr equal to) the determined minimum height plus an offset, and
        set a height of the pixel in the interpolated DEM data to the determined central value; and
    store, in a memory, the modified DEM file.

2. The storage device of claim 1, further comprising instructions stored thereon that, when executed by the one or more processors, cause the one or more processors to further create an edge map based on the received intensity data and wherein modification of the height of one or more pixels in the modified DEM file includes further modification of the height of one or more pixels in the modified DEM file based on the created edge map.

3. The storage device of claim 2, further comprising instructions stored thereon that, when executed by the one or more processors, cause the one or more processors to further create a foliage map and wherein modification of the height of one or more pixels in the modified DEM data includes further modification of the height based on the created foliage map.

4. The storage device of claim 3, wherein the instructions to fill in voids of the DEM data include instructions that, when executed by the one or more processors, cause the one or more processors to:
    determine whether a pixel in the DEM data includes a corresponding height that is not a number (NaN),
    determine whether there are more than a threshold number of pixels in a specified area of pixels around the pixel determined to include a corresponding height that is NaN,
    in response to a determination that there are more than a threshold number of pixels in a specified area of pixels around the pixel determined to include a corresponding height that is NaN, determine a central value of heights of pixels, around the pixel including the corresponding height that is NaN, that are within the specified area; and
    replace the height value of the pixel determined to include the corresponding height that is NaN with the determined central value.

5. The storage device of claim 4, wherein the instructions to create the edge map include instructions that, when executed by the one or more processors, cause the one or more processors to:
    compute a steepest intensity change at each pixel in the intensity data as respective entries in a slope map,
    create a histogram of the computed steepest intensity changes in the slope map,
    determine a slope threshold that accepts a specified number of pixels as edges, and
    set respective entries in the edge map in accord with whether a corresponding entry in the slope map includes a value greater than (or equal to) the determined threshold to a first specified value and set all other pixels to a second, different specified value to create the edge map.

6. The storage device of claim 4, wherein the instructions to create the shadow map include instructions that, when executed by the one or more processors, cause the one or more processors to:
    determine a maximum intensity of pixels in the PAN (or MS) image data,
    set a shadow threshold to a shadow ratio times the determined maximum intensity, and
    for each pixel in the PAN (or MS) image data that is less than (or equal to) the shadow threshold, set a corresponding entry in the shadow map to a specified value and setting all other entries in the shadow map to a different specified value.

7. The storage device of claim 6, further comprising instructions stored thereon that, when executed by the one or more processors, cause the one or more processors to further:
    determine if a pixel in the PAN or MS image data corresponds to a foliage pixel as defined by the foliage map, and in response to determining the pixel corresponds to a foliage pixel, correction of the height of one or more pixels in the interpolated DEM data includes:
    determine a central value of heights of a specified number of pixels in a neighborhood of the foliage pixel that are determined to be foliage pixels, and
    set the height of the foliage pixel to the determined central value.

8. The storage device of claim 7, further comprising instructions stored thereon that, when executed by the one or more processors, cause the one or more processors to further:
    determine if a pixel in the PAN or MS image data corresponds to an edge pixel as defined by the edge map, and in response to determining the pixel corresponds to an edge pixel, correction of the height of one or more pixels in the interpolated DEM data includes:
    determine a central value of heights of a specified number of pixels in a neighborhood of the edge pixel that are determined to be edge pixels, and
    setting the height of the edge pixel in the modified DEM data to the determined central value.

9. The storage device of claim 8, further comprising instructions stored thereon that, when executed by the one or more processors, cause the one or more processors to further:

determine if a pixel in the PAN or MS image does not correspond to any of a shadow pixel, an edge pixel, and a foliage pixel and, in response to determining the pixel does not correspond to any of a shadow pixel, an edge pixel, and a foliage pixel correction of the height of one or more pixels in the interpolated DEM data includes:

compute a histogram of height values of non-edge pixels in a neighborhood of the non-shadow, non-edge, and non-foliage pixel, determine a central value of heights of pixels in a bin of the histogram that includes the most pixels of all the bins, and replace the height value of the corresponding pixel in the modified DEM data with the determined central value.

10. A method for filtering digital elevation map (DEM) data, the operations comprising:

ingesting digital elevation map (DEM) data and intensity data from a panchromatic (PAN) or multi-spectral (MS) image;

filling in voids in the ingested DEM data using local interpolation to create interpolated DEM data;

creating a shadow map based on the received intensity data;

modifying, using the created shadow map, a height of one or more pixels in the interpolated DEM data to create modified DEM data including determining if a pixel in the PAN or MS image data corresponds to a shadow pixel as defined by the shadow map, and wherein modification of the height of one or more pixels in the ingested DEM data includes, in response to a determination that the pixel corresponds to a shadow pixel:

determining a number of pixels around the pixel corresponding to the shadow, determining a minimum height of all the pixels in the number of pixels around the pixel corresponding to the shadow based on height data in the interpolated DEM data, determining a central value of heights of pixels in the number of pixels around the pixel corresponding to the shadow determined to be less than (or equal to) the determined minimum height plus an offset, and setting a height of the pixel in the interpolated DEM data to the determined central value; and providing signals to a display that cause an image to be displayed based on the modified DEM data.

11. The method of claim 10, further comprising creating an edge map based on the received intensity data and wherein modifying the height of one or more pixels in the modified DEM file includes further modifying the height of one or more pixels in the modified DEM file based on the created edge map.

12. The method of claim 11, further comprising creating a foliage map and wherein modifying the height of one or more pixels in the modified DEM file includes further modifying the height based on the created foliage map.

13. The method of claim 12, wherein filling in voids of the ingested DIEM data includes:

determining whether a pixel in the DEM data includes a corresponding height that is not a number (NaN), determining whether there are more than a threshold number of pixels in a specified area of pixels around the pixel determined to include a corresponding height that is NaN, in response to a determination that there are more than a threshold number of pixels in a specified area of pixels around the pixel determined to include a corresponding height that is NaN, determining a central value of heights of pixels, around the pixel including the corresponding height that is NaN, that are within the specified area; and replacing the height value of the pixel determined to include the corresponding height that is NaN with the determined central value.

14. The method of claim 13, wherein creating the edge map includes:

computing a steepest intensity change at each pixel in the intensity data as respective entries in a slope map, creating a histogram of the computed steepest intensity changes in the slope map, determining a slope threshold that accepts a specified number of pixels as edges, and setting respective entries in the edge map in accord with whether a corresponding entry in the slope map includes a value greater than (or equal to) the determined threshold to a first specified value and set all other pixels to a second, different specified value to create the edge map.

15. A system for filtering digital elevation map (DE) data, the system comprising:

an ingest processor to ingest digital elevation map (DEM) data and intensity data from a panchromatic (PAN) or multi-spectral (MS) image;

a local interpolation processor to fill in voids in the ingested DEM data using local interpolation to create interpolated DEM data;

a shadow map processor to create a shadow map based on the received intensity data;

a height correction processor to:

determine if a pixel in the PAN or MS image data corresponds to a shadow pixel as defined by the shadow map, and wherein modification of the height of one or more pixels in the ingested DEM data includes, in response to a determination that the pixel corresponds to a shadow pixel:

determine a number of pixels around the pixel corresponding to the shadow, determine a minimum height of all the pixels in the number of pixels around the pixel corresponding to the shadow based on height data in the interpolated DEM data, determine a central value of heights of pixels in the number of pixels around the pixel corresponding to the shadow determined to be less than (or equal to) the determined minimum height plus an offset, and set a height of the pixel in the interpolated DEM data to the determined central value to create modified DEM data; and a memory to store the modified DEM data.

16. The system of claim 15, wherein the height correction processor is further to:

determine if a pixel in the PAN or MS image data corresponds to a foliage pixel as defined by the foliage map, and wherein modification of the height of one or more pixels in the interpolated DEM data includes, in response to a determination that the pixel corresponds to a foliage pixel:

determine a central value of heights of a specified number of pixels in a neighborhood of the foliage pixel that are determined to be foliage pixels, and set the height of the foliage pixel to the determined central value.

17. The system of claim 16, wherein the height correction processor is further to:

determine if a pixel in the PAN or MS image data corresponds to an edge pixel as defined by the edge map, and wherein modification of the height of one or more pixels in the interpolated DEM data includes, in response to a determination that the pixel corresponds to an edge pixel:

determine a central value of heights of a specified number of pixels in a neighborhood of the edge pixel that are determined to be edge pixels, and setting the height of the edge pixel in the modified DEM data to the determined central value.

18. The system of claim 17, wherein the height correction processor is further to:

determine if a pixel in the PAN or MS image does not correspond to any of a shadow pixel, an edge pixel, and a foliage pixel and, in response to determining the pixel does not correspond to any of a shadow pixel, an edge pixel, and a foliage pixel modification of the height of one or more pixels in the interpolated DEM data includes:

compute a histogram of height values of non-edge pixels in a neighborhood of the non-shadow, non-edge, and non-foliage pixel, determine a central value of heights of pixels in a bin of the histogram that includes the most pixels of all the bins, and replace the height value of the corresponding pixel in the modified DEM data with the determined central value.

* * * * *

UNITED STATES PATENT AND TRADEMARK OFFICE
CERTIFICATE OF CORRECTION

PATENT NO. : 10,055,885 B2  
APPLICATION NO. : 15/195198  
DATED : August 21, 2018  
INVENTOR(S) : Vernon R. Goodman Page 1 of 1

It is certified that error appears in the above-identified patent and that said Letters Patent is hereby corrected as shown below:

In the Specification

Column 8, Line 44, delete "6230." and insert --630.-- therefor

In the Claims

Column 17, Line 12, in Claim 1, delete "WAN)" and insert --(PAN)-- therefor

Column 17, Line 22, in Claim 1, after "map", insert --,--

Column 17, Line 34, in Claim 1, delete "(pr" and insert --(or-- therefor

Column 19, Line 57, in Claim 13, delete "DIEM" and insert --DEM-- therefor

Column 20, Line 21, in Claim 15, delete "(DE)" and insert --(DEM)-- therefor

Signed and Sealed this  
Twenty-first Day of April, 2020

Andrei Iancu  
*Director of the United States Patent and Trademark Office*